United States Patent Office 2,849,981
Patented Sept. 2, 1958

2,849,981

CULTIVATION BED FOR ARTIFICIALLY COLORING LIVE WORMS

John A. Rose, Hazel M. Rose, and Charles Ross, Tucson, Ariz.

No Drawing. Application February 25, 1957
Serial No. 641,838

3 Claims. (Cl. 119—1)

This invention relates to an artificially colored worm and to a novel process or method whereby live worms may be colored without any injurious effect on the worms.

More particularly, it is an object of the present invention to provide artificially colored worms to be used for fishing, hobbies or culture and by means of which process the natural color of live worms can be changed to various colors such as red, blue, green and yellow to enhance their use in connection with various hobbies and culture as well as for fishing.

Various other objects and advantages of the invention will appear from the more detailed description set forth below, it being understood that such a description is only intended to provide a disclosure of one preferred manner in which the method can be practiced and that various changes therein are contemplated and may be resorted to without departing from the scope of the invention.

It has ben found that live worms, such as earthworms, may be effectively colored substantially any desired color by the adding of any conventional pure edible food coloring to food fed to the worms and/or to the beds of earth or other material in which the worms are cultivated.

It has been found that very satisfactory results can be obtained by mixing sixteen parts of a pure edible food color with one part of a fruit juice or vegetable juice. Approximately one ounce of such a mixture when applied to food which is fed to worms and to beds in which the worms are cultivated or shipped will effectively color approximately one hundred worms so that the worms will be artificially colored to a color corresponding substantially to the color of the mixture.

Approximately one week is required after the mixture is applied to the food and bedding for accomplishing the artificial coloring of the worms. It has also been found that the artificially colored worms after such a coloring treatment of one week will retain the artificial coloring for at least a month while placed in soil or earth containing no coloring or no colored food.

From the foregoing it will be readily apparent that a new type of artificially colored cultivated worm can be produced by the novel method as described and which possesses utility in connection with various hobbies, culture and fishing, not offered by a worm of natural color. It will also be apparent that the edible food coloring utilized in the practice of the method will in no way adversely affect or injure the live worms which are thus artificially colored.

Various modifications and changes are contemplated and may be resorted to, without departing from the function or scope of the invention as hereinafter defined by the appended claims.

We claim as our invention:

1. A cultivation bed for live worms consisting of a suitable media to support worm life, said media containing a nonpoisonous food coloring adapted to artificially color the worms contained therein.

2. A cultivation bed for live worms as in claim 1 wherein approximately one ounce of the food coloring is applied to said media for approximately each one hundred worms contained therein.

3. A cultivation bed for live worms as in claim 2, wherein approximately one part of a fruit juice is mixed with approximately each sixteen parts of the food coloring.

References Cited in the file of this patent

UNITED STATES PATENTS 2,649,759   Gibbs _____ Oct. 5, 1950

FOREIGN PATENTS 695,296   France _____ May 8, 1930